(12) United States Patent
Palangi et al.

(10) Patent No.: US 12,444,106 B2
(45) Date of Patent: Oct. 14, 2025

(54) AUTOMATED EVALUATION OF SPATIAL RELATIONSHIPS IN IMAGES

(71) Applicant: Microsoft Technology Licensing, LLC, Redmond, WA (US)

(72) Inventors: Hamid Palangi, Kirkland, WA (US); Besmira Nushi, Woodinville, WA (US); Vibhav Vineet, Bellevue, WA (US); Eric J. Horvitz, Kirkland, WA (US); Semiha E. Kamar Eden, Redmond, WA (US); Tejas Gokhale, Tempe, AZ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 18/198,593

(22) Filed: May 17, 2023

(65) Prior Publication Data
US 2024/0203005 A1    Jun. 20, 2024

Related U.S. Application Data

(60) Provisional application No. 63/433,270, filed on Dec. 16, 2022.

(51) Int. Cl.
*G06T 11/60*    (2006.01)
*G06F 40/40*    (2020.01)
(Continued)

(52) U.S. Cl.
CPC ............. *G06T 11/60* (2013.01); *G06F 40/40* (2020.01); *G06T 7/11* (2017.01); *G06T 7/60* (2013.01);
(Continued)

(58) Field of Classification Search
CPC ... G06T 11/60; G06T 7/11; G06T 7/75; G06T 7/60; G06T 2207/20081; G06F 40/40
See application file for complete search history.

(56) References Cited

U.S. PATENT DOCUMENTS

2015/0039542 A1\* 2/2015 Datta ..................... G06F 16/51
                                                    706/12
2018/0137551 A1\* 5/2018 Zheng .................... G06V 20/63
(Continued)

OTHER PUBLICATIONS

Liu, Chunxiao, "Graph Structured Network for Image-Text Matching," 2020 IEEE/CVF Conference on Computer Vision and Pattern Recognition (CVPR), 2020, pp. 10918-10927 (Year: 2020).\*
(Continued)

*Primary Examiner* — Terrell M Robinson
(74) *Attorney, Agent, or Firm* — Rainier Patents, P.S.

(57) ABSTRACT

This document relates to automated analysis of images. One example method involves obtaining an image and text associated with the image, detecting two or more objects in the image, and determining respective locations of the two or more detected objects in the image. The example method also involves determining whether a spatial relationship between the two or more detected objects matches a corresponding spatial relationship expressed by the text based at least on the respective locations of the two or more detected objects. The example method also involves outputting a value reflecting whether the spatial relationship between the two or more detected objects matches the corresponding spatial relationship expressed by the text.

20 Claims, 11 Drawing Sheets

(51) Int. Cl.
*G06T 7/11* (2017.01)
*G06T 7/60* (2017.01)
*G06T 7/73* (2017.01)

(52) U.S. Cl.
CPC ...... *G06T 7/75* (2017.01); *G06T 2207/20081* (2013.01)

(56) References Cited

U.S. PATENT DOCUMENTS

| | | | | |
|---|---|---|---|---|
| 2018/0373979 | A1* | 12/2018 | Wang | G06F 18/24143 |
| 2023/0162481 | A1* | 5/2023 | Yuan | G06T 9/00 |
| | | | | 382/159 |

OTHER PUBLICATIONS

Agrawal, et al., "Don't Just Assume; Look and Answer: Overcoming Priors for Visual Question Answering", In Proceedings of the IEEE Conference on Computer Vision and Pattern Recognition, Jun. 18, 2018, pp. 4971-4980.

Anderson, et al., "SPICE: Semantic Propositional Image Caption Evaluation", In Proceedings of 14th European Conference Computer Vision, Oct. 11, 2016, pp. 382-398.

Anderson, et al., "Vision-and-Language Navigation: Interpreting Visually-Grounded Navigation Instructions in Real Environments", In Proceedings of the IEEE Conference on Computer Vision and Pattern Recognition, Jun. 18, 2018, pp. 3674-3683.

Banerjee, et al., "METEOR: An Automatic Metric for MT Evaluation with Improved Correlation with Human Judgments", In Proceedings of the ACL workshop on intrinsic and extrinsic evaluation measures for machine translation and/or summarization, Jun. 29, 2005, pp. 65-72.

Carion, et al., "End-to-End Object Detection with Transformers", In Proceedings of 16th European Conference Computer Vision, Aug. 23, 2020, pp. 213-229.

Chen, et al., "Touchdown: Natural Language Navigation and Spatial Reasoning in Visual Street Environments", In Proceedings of the IEEE/CVF Conference on Computer Vision and Pattern Recognition, Jun. 16, 2019, pp. 12538-12547.

Cho, et al., "Dall-Eval: Probing the Reasoning Skills and Social Biases of Text-To-Image Generative Transformers", In repository of arXiv:2202.04053v2, Nov. 14, 2022, 21 Pages.

Conwell, et al., "Testing Relational Understanding in Text-Guided Image Generation", In repository of arXiv:2208.00005v1, Jul. 29, 2022, 11 Pages.

Dayma, Boris, "Dall•E Mini—Generate images from a text prompt", Retrieved From: https://reposhub.com/python/deep-learning/borisdayma-dalle-mini.html, Aug. 9, 2021, 9 Pages.

Ding, et al., "CogView2: Faster and Better Text-to-Image Generation via Hierarchical Transformers", In repository of arXiv:2204.14217v2, May 27, 2022, 15 Pages.

Feng, et al., "Training-Free Structured Diffusion Guidance for Compositional Text-to-Image Synthesis", In Proceedings of the Eleventh International Conference on Learning Representations, Feb. 2, 2023, 21 Pages.

Goel, et al., "IQ-VQA: Intelligent Visual Question Answering", In repository of arXiv:2007.04422v1, Jul. 8, 2020, 13 Pages.

Gokhale, et al., "VQA-LOL: Visual Question Answering Under the Lens of Logic", In Proceedings of 16th European Conference Computer Vision, Aug. 23, 2020, pp. 379-396.

Hendricks, et al., "Women also Snowboard: Overcoming Bias in Captioning Models", In Proceedings of the European Conference on Computer Vision, Sep. 8, 2018, pp. 1-17.

Hessel, et al., "CLIPScore: A Reference-free Evaluation Metric for Image Captioning", In Proceedings of the 2021 Conference on Empirical Methods in Natural Language Processing, Nov. 7, 2021, pp. 7514-7528.

Heusel, et al., "GANs Trained by a Two Time-Scale Update Rule Converge to a Local Nash Equilibrium", In Journal of Advances in neural information processing systems, vol. 30, Dec. 4, 2017, 12 Pages.

Hinz, et al., "Semantic Object Accuracy for Generative Text-to-Image Synthesis", In Journal of IEEE transactions on pattern analysis and machine intelligence, vol. 44, Issue 3, Sep. 2, 2020, pp. 1552-1565.

Hong, et al., "Learning Hierarchical Semantic Image Manipulation through Structured Representations", In Proceedings of the 32nd International Conference on Neural Information Processing Systems, Dec. 3, 2018, 11 Pages.

Hudson, et al., "Compositional Attention Networks for Machine Reasoning", In Proceedings of International Conference on Learning Representations, Apr. 30, 2018, 20 Pages.

Johnson, et al., "CLEVR: A Diagnostic Dataset for Compositional Language and Elementary Visual Reasoning", In Proceedings of the IEEE Conference on Computer Vision and Pattern Recognition, Jul. 21, 2017, pp. 2901-2910.

Kervadec, et al., "Roses are Red, Violets are Blue . . . But Should VQA expect Them To?", In repository of arXiv:2006.05121v2, Dec. 8, 2020, pp. 4321-4334.

Leivada, et al., "DALL-E 2 Fails to Reliably Capture Common Syntactic Processes", In repository of arXiv:2210.12889v2, Oct. 23, 2022, 25 Pages.

Lin, et al., "Microsoft COCO: Common Objects in Context", In Proceedings of 13th European Conference Computer Vision, Sep. 6, 2014, pp. 740-755.

Lin, Chiny. , "ROUGE: A Package for Automatic Evaluation of Summaries", In Proceedings of Text summarization branches out, Jul. 26, 2004, 8 Pages.

Liu, et al., "CLEVR-Ref+: Diagnosing Visual Reasoning With Referring Expressions", In Proceedings of the IEEE/CVF Conference on Computer Vision and Pattern Recognition, Jun. 16, 2019, pp. 4185-4194.

Liu, et al., "Compositional Visual Generation with Composable Diffusion Models", In Proceedings of 17th European Conference Computer Vision, Oct. 23, 2022, pp. 423-439.

Liu, et al., "Visual Spatial Reasoning", In repository of arXiv:2205.00363v1, Apr. 30, 2022, 16 Pages.

Marcus, et al., "A very preliminary analysis of DALL-E 2", In repository of arXiv:2204.13807v2, May 2, 2022, 14 Pages.

Mees, et al., "Learning Object Placements For Relational Instructions by Hallucinating Scene Representations", In Proceedings of 2020 IEEE International Conference on Robotics and Automation, May 31, 2020, pp. 94-100.

Minderer, et al., "Simple Open-Vocabulary Object Detection with Vision Transformers", In repository of arXiv:2205.06230v2, Jul. 20, 2022, 28 Pages.

Nair, et al., "Learning Language-Conditioned Robot Behavior from Offline Data and Crowd-Sourced Annotation", In Proceedings of Conference on Robot Learning, Jan. 11, 2022, pp. 1-13.

Nichol, et al., "GLIDE: Towards Photorealistic Image Generation and Editing with Text-Guided Diffusion Models", In repository of arXiv:2112.10741v1, Dec. 22, 2021, 20 Pages.

Nilsback, et al., "Automated Flower Classification over a Large Number of Classes", In Proceedings of 2008 Sixth Indian Conference on Computer Vision, Graphics & Image Processing, Dec. 16, 2008, pp. 722-729.

Papineni, et al., "BLEU: a Method for Automatic Evaluation of Machine Translation", In Proceedings of the 40th annual meeting of the Association for Computational Linguistics, Jul. 6, 2002, pp. 311-318.

Ramesh, et al., "Hierarchical Text-Conditional Image Generation with CLIP Latents", In repository of arXiv:2204.06125v1, Apr. 13, 2022, 27 Pages.

Ray, et al., "Sunny and Dark Outside?! Improving Answer Consistency in VQA through Entailed Question Generation", In Proceedings of the 2019 Conference on Empirical Methods in Natural Language Processing and the 9th International Joint Conference on Natural Language Processing, Nov. 3, 2019, pp. 5860-5865.

(56) References Cited

OTHER PUBLICATIONS

Reed, et al., "Generative Adversarial Text to Image Synthesis", In Proceedings of the 33rd International Conference on Machine Learning, PMLR, Jun. 19, 2016, 10 Pages.

Rombach, et al., "High-Resolution Image Synthesis with Latent Diffusion Models", In Proceedings of the IEEE/CVF Conference on Computer Vision and Pattern Recognition, Jun. 18, 2022, pp. 10684-10695.

Saharia, et al., "Photorealistic Text-to-Image Diffusion Models with Deep Language Understanding", In repository of arXiv:2205.11487v1, May 23, 2022, 46 Pages.

Salimans, et al., "Improved Techniques for Training GANs", In Journal of Advances in neural information processing systems, vol. 29, Dec. 5, 2016, 9 Pages.

Vedantam, et al., "Cider: Consensus-based image description evaluation", In Proceedings of the IEEE Conference on Computer Vision and Pattern Recognition, Jun. 7, 2015, pp. 4566-4575.

Welinder, et al., "Caltech-UCSD Birds 200", Published by California Institute of Technology, Jan. 1, 2010, 15 Pages.

Xu, et al., "AttnGAN: Fine-Grained Text to Image Generation With Attentional Generative Adversarial Networks", In Proceedings of the IEEE Conference on Computer Vision and Pattern Recognition, Jun. 18, 2018, pp. 1316-1324.

Ye, et al., "A Case Study of the Shortcut Effects in Visual Commonsense Reasoning", In Proceedings of the AAAI conference on artificial intelligence, May 18, 2021, pp. 3181-3189.

Yu, et al., "Scaling Autoregressive Models for Content-Rich Text-to-Image Generation", In repository of arXiv:2206.10789v1, Jun. 22, 2022, 49 Pages.

Zhang, et al., "StackGAN: Text to Photo-Realistic Image Synthesis with Stacked Generative Adversarial Networks", In Proceedings of the IEEE International Conference on Computer Vision, Oct. 22, 2017, pp. 5907-5915.

Zhao, et al., "Men Also Like Shopping: Reducing Gender Bias Amplification using Corpus-level Constraints", In Proceedings of the Conference on Empirical Methods in Natural Language Processing, Sep. 7, 2017, pp. 2979-2989.

Frolov, et al., "Adversarial text-to-image synthesis: A review.", Neural Networks, vol. 144, Aug. 8, 2021, pp. 187-209.

International Search Report and Written Opinion received for PCT Application No. PCT/US2023/081056, Mar. 12, 2024, 13 pages.

Xia, et al., "Exploring entity-level spatial relationships for image-text matching.", ICASSP 2020-2020 IEEE International Conference on Acoustics, Speech and Signal Processing (ICASSP), May 4, 2020, pp. 4452-4456.

International preliminary Report on Patentability received for PCT Application No. PCT/US23/081056, Jun. 26, 2025, 8 pages.

\* cited by examiner

OBJECT ACCURACY CORRELATION CHART 800

VISOR CORRELATION CHART 850

AUTOMATED EVALUATION OF SPATIAL RELATIONSHIPS IN IMAGES

BACKGROUND

There are many computing scenarios where automated metrics are beneficial for evaluating data. For instance, automated mean opinion score ratings can substitute for human ratings of speech quality. Likewise, automated scores can substitute for human ratings to evaluate image quality. However, existing techniques for automated evaluation of image quality have certain drawbacks with respect to spatial relationships between objects in a given image, as discussed more below.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for automated evaluation of spatial relationships in images. One example includes a method or technique that can be performed on a computing device. The method or technique can include obtaining an image and text associated with the image and detecting two or more objects in the image. The method or technique can also include determining respective locations of the two or more detected objects in the image. The method or technique can also include, based at least on the respective locations of the two or more detected objects, determining whether a spatial relationship between the two or more objects matches a corresponding spatial relationship expressed by the text. The method or technique can also include outputting a value reflecting whether the spatial relationship between the two or more objects matches the corresponding spatial relationship expressed by the text.

Another example includes a system having a hardware processing unit and a storage resource storing computer-readable instructions. When executed by the hardware processing unit, the computer-readable instructions can cause the system to determine respective locations of two or more objects in an image. The computer-readable instructions can also cause the system to, based at least on the respective locations of the two or more objects, determine whether a spatial relationship between the two or more objects matches a corresponding spatial relationship expressed by text associated with the image. The computer-readable instructions can also cause the system to output a value reflecting whether the spatial relationship between the two or more detected objects matches the corresponding relationship expressed by the text associated with the image.

Another example includes a computer-readable storage medium. The computer-readable storage medium can store instructions which, when executed by a computing device, cause the computing device to perform acts. The acts can include obtaining an image and text relating to the image, detecting two or more objects in the image, and determining respective locations of the two or more detected objects in the image. The acts can also include, based at least on the respective locations of the two or more detected objects, determining whether a spatial relationship between the two or more detected objects matches a corresponding spatial relationship expressed by the text. The acts can also include outputting a value reflecting whether the spatial relationship between the two or more detected objects matches a corresponding spatial relationship expressed by the text.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
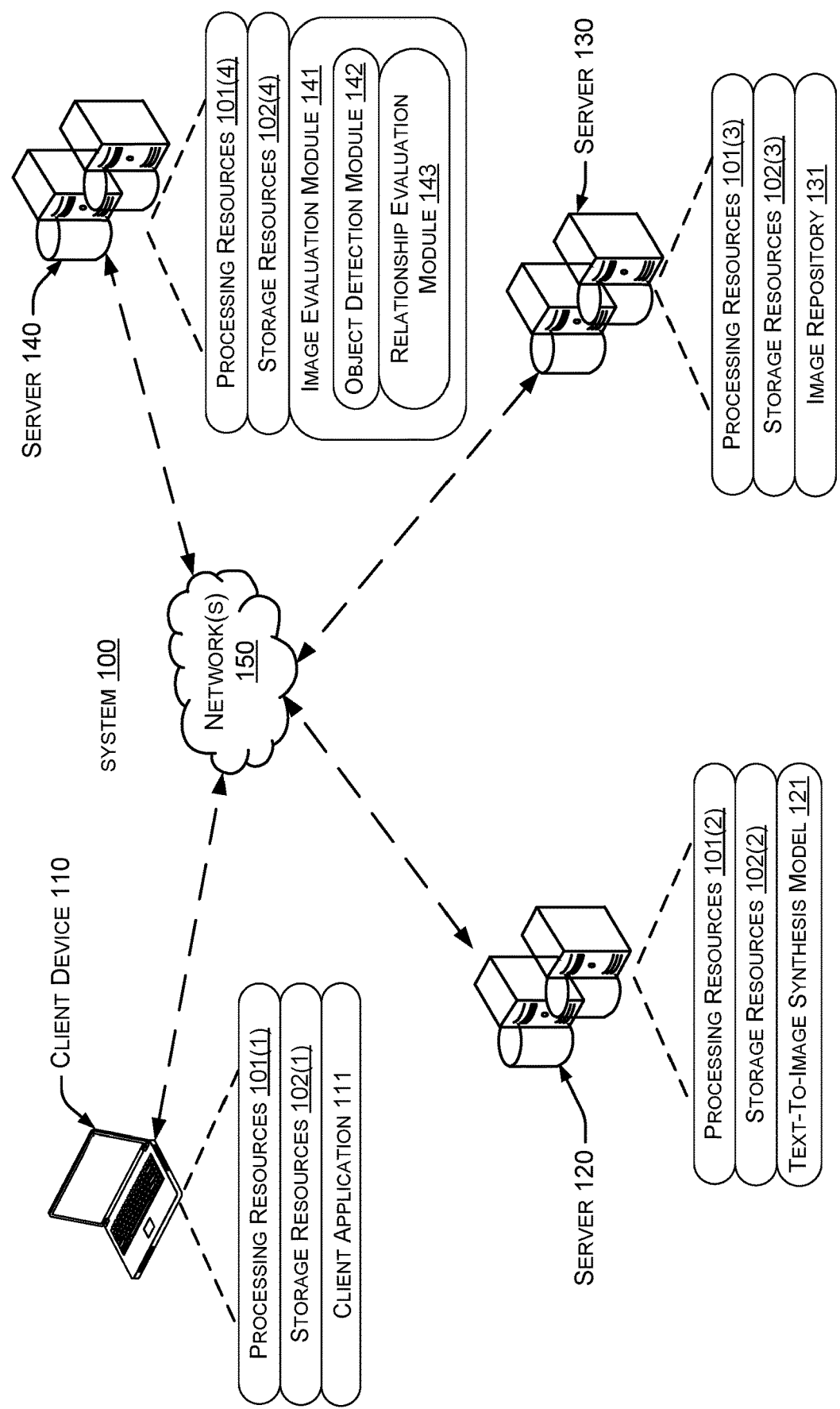
FIG. 1 illustrates an example system, consistent with some implementations of the present concepts.

There are a number of computing scenarios where images are associated with text. For example, a user might submit a text query to a search engine to search for images, a user might add a caption to an image that they post on social media, or a user might input text to a text-to-image synthesis model that synthesizes an image based on the text. Various metrics exist for evaluating the quality of a given image independently from text, and other metrics exist for evaluating how well a given image matches associated text.

However, in some cases, text can convey spatial relationships between objects, and existing metrics do not effectively characterize how well corresponding images reflect the spatial relationships conveyed by the text. The disclosed implementations offer several metrics, referred to collectively below as VISOR metrics, that can be employed to evaluate whether spatial relationships between objects in an image match corresponding spatial relationships expressed by text. As such, the disclosed metrics can be employed for a wide range of applications, such as ranking text-to-image synthesis models, filtering search results, or evaluating image captions.

Definitions

For the purposes of this document, the term "text-to-image synthesis model" refers to a model that receives text as input and generates an image as output. For instance, a text-to-image synthesis model could receive a phrase or sentence identifying one or more object categories (e.g., a dog and a cat), and output an image that includes instances of the one or more object categories (e.g., an image of a dog standing next to a cat). The term "image-to-text model" refers to a model that receives an image as input and generates text as output. For instance, an image-to-text model could receive an image of a German Shepherd standing next to a robin and output the phrase "a dog standing next to a bird."

The term "model" is used generally herein to refer to a range of processing techniques, and includes models trained using machine learning as well as hand-coded (e.g., heuristic-based) models. For instance, a machine-learning model could be a neural network, a support vector machine, a decision tree, etc. The term "image" as used herein refers to both still images (e.g., pictures) as well as videos. The term "text" as used herein refers to representations of natural language, such as letters, special characters, and/or combinations thereof—words, phrases, complete sentences, paragraphs, etc.

Machine Learning Overview

There are various types of machine learning frameworks that can be trained to perform a given task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "parameters" when used without a modifier is used herein to refer to learnable values such as edge weights and bias values that can be learned by training a machine learning model, such as a neural network.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with parameters for the model structure that have been trained or tuned. Note that two trained models can share the same model structure and yet have different values for the parameters, e.g., if the two models are trained on different training data or if there are underlying stochastic processes in the training process.

Example System

The present implementations can be performed in various scenarios on various devices. FIG. 1 shows an example system 100 in which the present implementations can be employed, as discussed more below.

As shown in FIG. 1, system 100 includes a client device 110, a server 120, a server 130, and a server 140, connected by one or more network(s) 150. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 1, but particularly the servers, can be implemented in data centers, server farms, etc.

Certain components of the devices shown in FIG. 1 may be referred to herein by parenthetical reference numbers. For the purposes of the following description, the parenthetical (1) indicates an occurrence of a given component on client device 110, (2) indicates an occurrence of a given component on server 120, (3) indicates an occurrence on server 130, and (4) indicates an occurrence on server 140. Unless identifying a specific instance of a given component, this document will refer generally to the components without the parenthetical.

Generally, the devices 110, 120, 130, and/or 140 may have respective processing resources 101 and storage resources 102, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Server 120 can include a text-to-image synthesis model 121 that receives text and automatically generates images. The images can be uploaded to server 140 for processing by image evaluation module 141. Server 130 can include an image repository 131 with searchable images. Images from the image repository can also be uploaded to server 140 for processing by image evaluation module 141. The image repository can provide search functionality, e.g., as part of a general-purpose web search engine and/or as part of an image hosting service where each user can search their own photos in the repository.

Image evaluation module 141 can evaluate the images received from server 130 and/or 140 to produce values that characterize relationships between objects in the images. For instance, the values can characterize whether the relationships match corresponding relationships expressed in text, such as text used by the text-to-image synthesis model to generate a particular image, a query submitted by a user of client application 111, and/or a manually or automatically generated caption for an image in the image repository on server 130.

To evaluate a given image, the image evaluation module 141 can input the image to object detection module 142. The object detection module can automatically detect objects in the image and output categories as well as bounding boxes for each detected object. The relationship evaluation module 143 can determine whether a spatial relationship between the detected objects matches text associated with that image, such as text used to generate the image, a query used to search for the image, and/or a caption associated with the image. The image evaluation module can calculate a value for a metric for that image, where the value indicates whether the detected objects match respective object categories from the text as well as a corresponding spatial relationship expressed by the text.

Example Method

Figure 2:
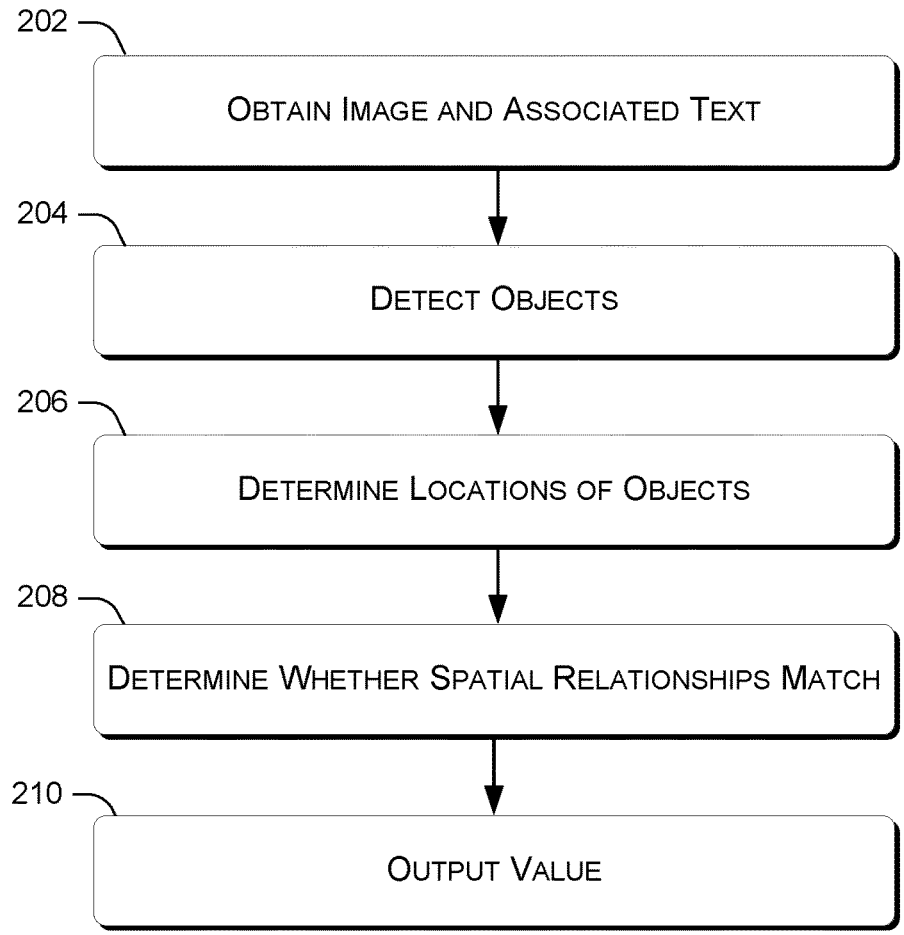
FIG. 2 illustrates an example method or technique, consistent with some implementations of the present concepts.

FIG. 2 illustrates an example method 200, consistent with the present concepts. Method 200 can be implemented on many different types of devices, e.g., by one or more cloud servers, by a client device such as a laptop, tablet, or smartphone, or by combinations of one or more servers, client devices, etc.

Method 200 begins at block 202, where an image is obtained, as well as text associated with the image. The text can be a query used to search for the image, an automatically- or manually-generated caption for the image, and/or text that was input to a text-to-image synthesis model to generate the image.

Method 200 continues at block 204, where two or more objects are detected in the image. For example, an object detector can automatically identify respective categories of the detected objects.

Method 200 continues at block 206, where respective locations of the two or more detected objects are determined. For example, the object detector can identify bounding boxes for the detected objects.

Method 200 continues at block 208, where it is determined whether the spatial relationship between the two or more detected objects matches a corresponding spatial relationship expressed by the text. For instance, centroids of the bounding boxes can be used to determine whether one object is above, below, to the left, or to the right of another object.

Method 200 continues at block 210, where a value is output reflecting whether the spatial relationship between the two or more detected objects matches the corresponding spatial relationship expressed by the text. For instance, the value can be calculated as set forth for the VISOR metric below.

Note that method 200 can be performed multiple times for one or more text-to-image synthesis models. Multiple instances of text can be input to a given text-to-image synthesis model to generate multiple images. The same or different instances of text can be input to one or more other text-to-image synthesis models to evaluate, rank, or otherwise compare the different text-to-image synthesis models.

Specific Algorithms

The following describes versions of a metric collectively referred to as "VISOR" to quantify spatial reasoning performance. To evaluate the performance of VISOR, a dataset called SR2D was created. SR2D contains sentences that describe spatial relationships (left/right/above/below) between a pair of objects.

Spatial Relationships Dataset

Let $\mathcal{C}$ be a set of object categories. Let $\mathcal{R}$ be a set of spatial relationships between objects. Consider the following two-dimensional relationships, i.e. $\mathcal{R}$ ={left, right, above, below}, and 80 object categories derived from the MS-COCO dataset. Lin, et al., (2014). *Microsoft coco: Common objects in context.* In Computer Vision-ECCV 2014: 13th European Conference, Zurich, Switzerland, Sep. 6-12, 2014, Proceedings, Part V 13 (pp. 740-755). Springer International Publishing. Then, for every $A \in \mathcal{C}$, $B \in \mathcal{C}$, and $R \in \mathcal{R}$, let the predicate R(A, B) indicate that the spatial relationship R exists between object A and object B. For example (cat, dog) describes a scene where a cat is to the left of a dog. For each pair, 8 types of spatial relationships can be constructed:

left(A, B), right(A, B), above(A, B), below(A, B)
left(B, A), right(B, A), above(B, A), below(B, A).

Each predicate R(A, B), can be converted into a template <A> <R> <B>, and paraphrased into natural language. Appropriate articles "a"/"an" are prepended to object names A and B, to obtain four templates:

A/an <A> to the left of a/an <B>
A/an <A> to the right of a/an <B>
A/an <A> above a/an <B>
A/an <A> below a/an <B>.

The template-based procedure has can mitigate linguistic ambiguity, subjectivity, and grammatical errors. In addition, the template-based approach is extensible to new object categories and additional spatial relationships. While the following discussion focuses on two-dimensional relationships, templates can be extended for generating test inputs for evaluating more complex spatial relationships and geometric features of objects.

Given $|\mathcal{C}|$=80 object categories from MS-COCO and two objects per image yields a binomial coefficient of 3160 unique combinations of object pairs (A, B). For each pair, the 8 types of spatial relationships listed above can be constructed, which leads to a total of 3,160×8=25,280 predicates. The SR2D dataset contains 25,280 text examples, uniformly distributed across 80 COCO object categories, with each object being found in 632 images. The following Table 1 shows a few examples:

| A | B | R | Text |
|---|---|---|---|
| microwave | sink | left | A microwave to the left of a sink |
| elephant | cat | right | An elephant to the right of a cat |
| donut | airplane | above | A donut above an airplane |
| suitcase | chair | below | A suitcase below a chair |

VISOR Metric Computations

Let h be an oracle function that returns a set of detected objects in image x from set $\mathcal{C}$. Then, object accuracy (OA) for an image x, generated by a sentence containing objects A and B is:

$$OA(x, A, B) = 1_{h(x)}(A \cap B). \quad (1)$$

Note that the oracle function h here could be either an automated model or a human detecting the presence of objects mentioned in the sentence. Object accuracy is agnostic to the relationship R, whose presence is instead captured in the VISOR metric.

Let $R_{gen}$ be the generated spatial relationship, while R is the ground-truth relationship mentioned in text. Then, for each image x, $$VISOR(x, A, B, R) = \begin{cases} 1, & \text{if } R_{gen} = R \cap A \cap B \\ 0, & \text{otherwise} \end{cases} \quad (2)$$

A useful feature of text-to-image synthesis models for artists and designers is the ability to generate multiple images for each input text prompt. This allows the creators to pick an appropriate image from N generated images. A metric $VISOR_n$ is defined herein to reflect how good text-to-image synthesis models are at generating at least n spatially correct images given a text input that mentions a spatial relationship. From a usability perspective, this relaxed version of VISOR is useful for measuring if it is possible to find at least n images (e.g., a threshold nuumber of images) that would satisfy the input sentence where the task is one where the creator has the option to pick from the output image set.

$VISOR_n$ is the probability of generating images such that for every text prompt t, at least n out of N images have VISOR=1:

$$VISOR_n(x, A, B, R) = \begin{cases} 1, & \text{if } \sum_{i=1}^{N} VISOR(x_i, A, B, R) \geq n \\ 0, & \text{otherwise} \end{cases} \quad (3)$$

The relationship between VISOR and $VISOR_n$ is given below.

$$VISOR = \frac{1}{N} \sum_{n=0}^{N} n(VISOR_n - VISOR_{n+1}). \quad (4)$$

The following discussion uses N=4 images per text prompt and, therefore, the following metrics are discussed: $VISOR_1$, $VISOR_2$, $VISOR_3$, and $VISOR_4$. Note that VISOR=1 only if both objects are generated in the image, i.e. OA=1. However, text-to-image synthesis models can fail to generate multiple objects in a large subset of images. As such, it is useful to disentangle the two abilities of the models to (1) generate multiple objects and (2) generate them according to the spatial relationships described in the text of the prompt. For this purpose, the metric conditional VISOR is defined as the conditional probability of correct spatial relationships being generated, given that both objects were generated correctly:

$$VISOR_{cond} = P(R_{gen} = R | A \cap B) = \frac{P(R_{gen} = R \cap A \cap B)}{P(A \cap B)} \quad (5)$$

Figure 3:
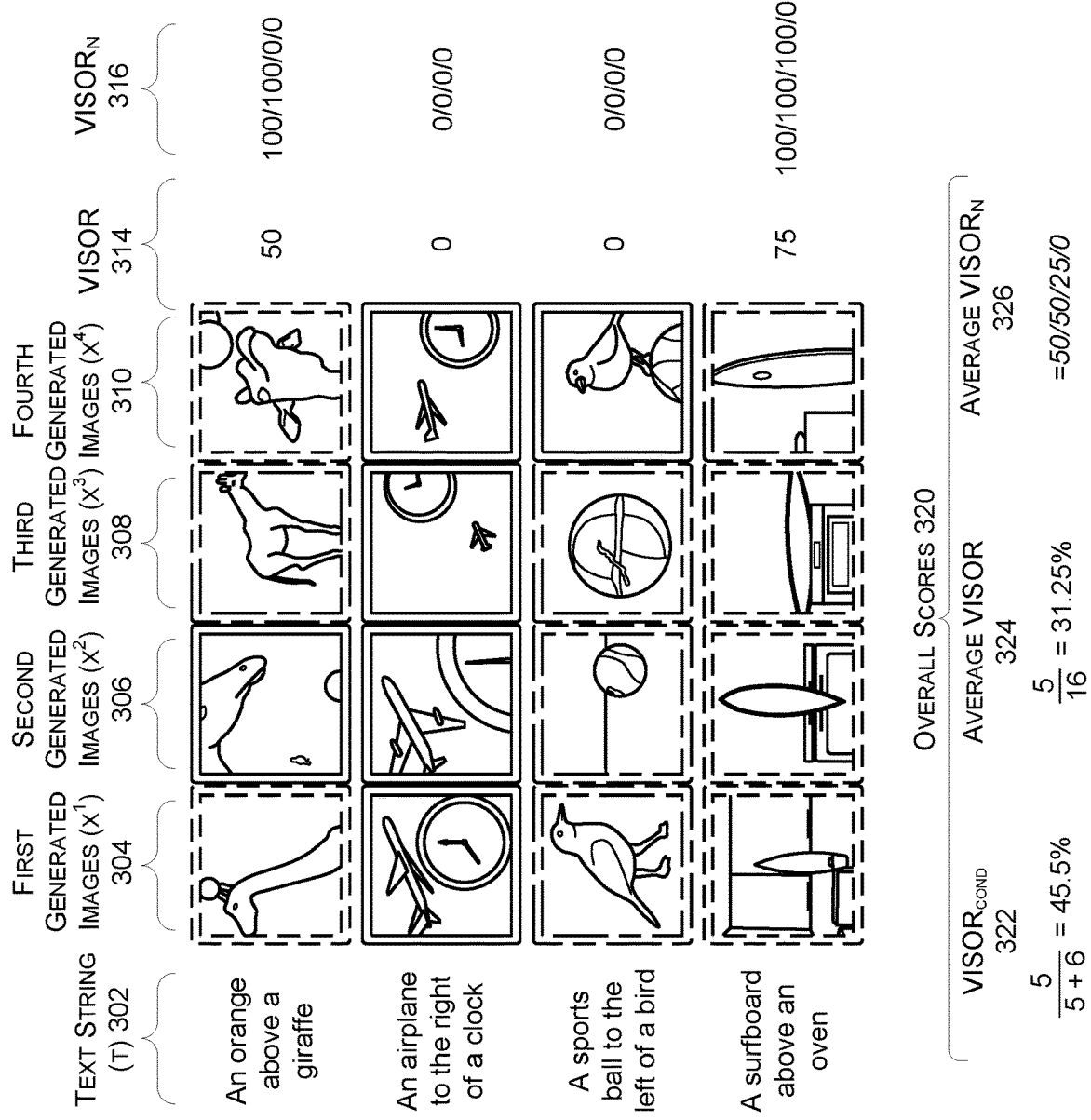
FIG. 3 illustrates example images, text strings, and corresponding metrics that can be calculated for the images, consistent with some implementations of the present concepts.

The VISOR computation process is summarized in FIG. 3, which shows examples illustrating the intuition behind OA, VISOR, $VISOR_{cond}$, and $VISOR_{1/2/3/4}$. Four text strings 302 are shown, together with four images 304, 306, 308, and 310, e.g., generated from those text strings by a text-to-image synthesis model. Legend 312 shows that alternating long and short dash borders are used to represent images where one or both objects were not present in the generated images, solid line borders are used to represent images where both objects are generated but with an incorrect spatial relationship, and short dash borders are used to represent successfully-generated images where the correct objects are generated with the correct spatial relationships. Corresponding borders around each of the generated images are used to convey whether that particular image has the correct objects and/or correct spatial relationships expressed by the corresponding text string.

VISOR percentage scores 314 are shown for each set of four images. The first row of images includes two images with the correct objects and spatial relationships, resulting in a 50% correct percentage for the VISOR scores. The second and third rows of images do not have any images with the correct objects and spatial relationships, resulting in a 0% correct percentage for the VISOR scores. The fourth row of images includes three images with the correct objects and spatial relationships, resulting in a 75% correct percentage for the VISOR scores.

In addition, FIG. 3. shows the following additional VISOR metrics. VISORn percentages 316 are shown for each row of four images. For example, since the first row includes two correct images, the percentage values for $VISOR_1$, $VISOR_2$, $VISOR_3$, and $VISOR_4$ are 100, 100, 0, and 0, respectively. Overall scores 320 can be calculated over all 16 images. The overall scores include VISORcond 322, average VISOR 324, and average VISORn 326. Here, VISORcond has a value of 5/11, because there are a total of 5 images with the correct spatial relationship (short dash border) out of a total of 11 images with the correct object categories, 6 of which have incorrect spatial relationships (solid border). Average VISOR 324 is calculated over all 16 images, 5 of which have the correct spatial relationship. Average VISORn 326 is also calculated over all 16 images, e.g., the average percentage values for $VISOR_1$ is 50% because $VISOR_1$ is 100% for the first and last rows of images and 0% for the second and third rows.

To calculate the VISOR metrics described previously, the following processing can be performed. Given any text prompt t and a text-to-image synthesis model g, first generate images x=g(t), and use an object detector to localize objects in x. Object accuracy OA can be computed as described above. Centroid coordinates of objects A and B can be obtained from the bounding boxes of the detected objects.

Figure 4:
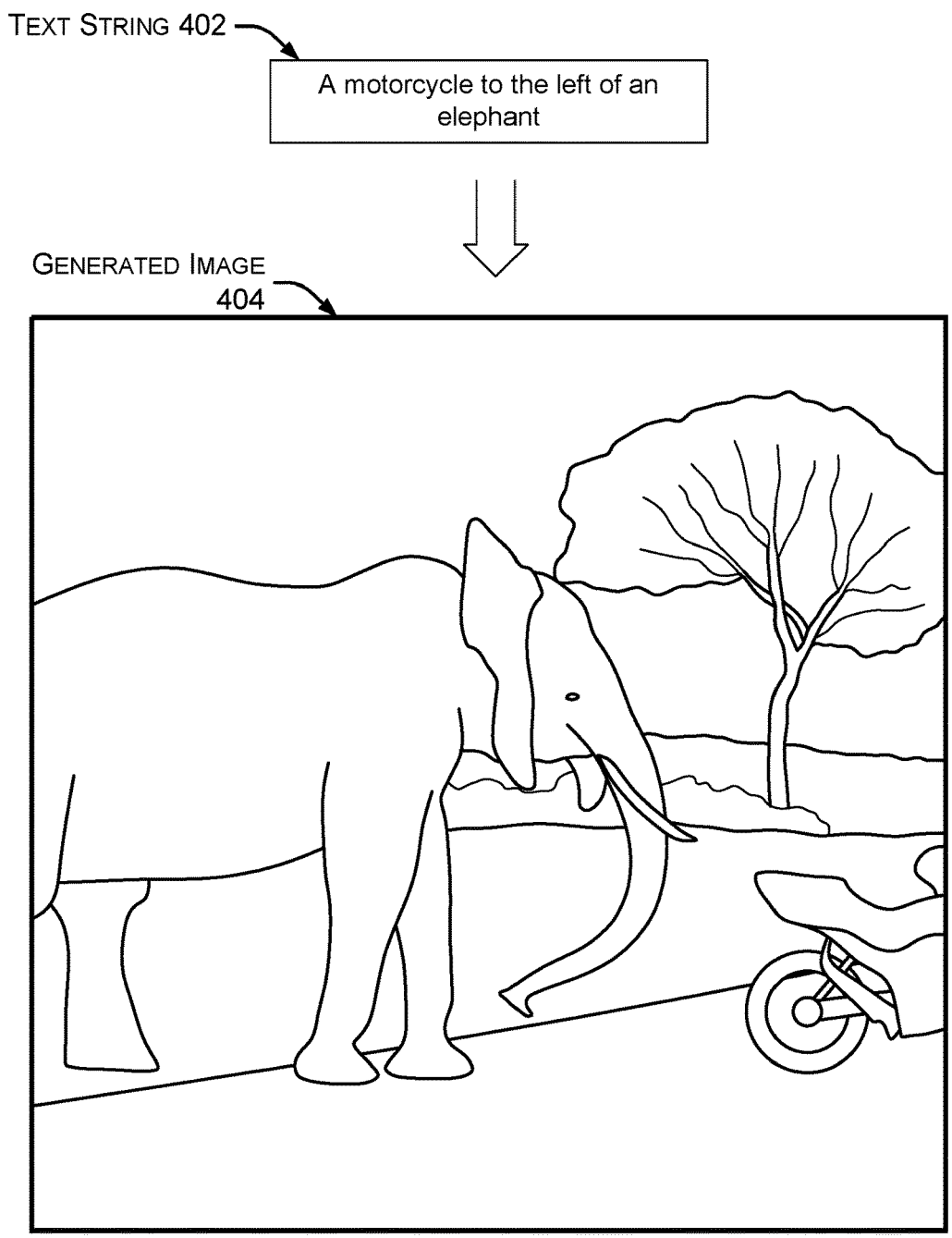
FIG. 4 illustrates an example of a text string that can be used to generate a corresponding image, consistent with some implementations of the present concepts.
Figure 5:
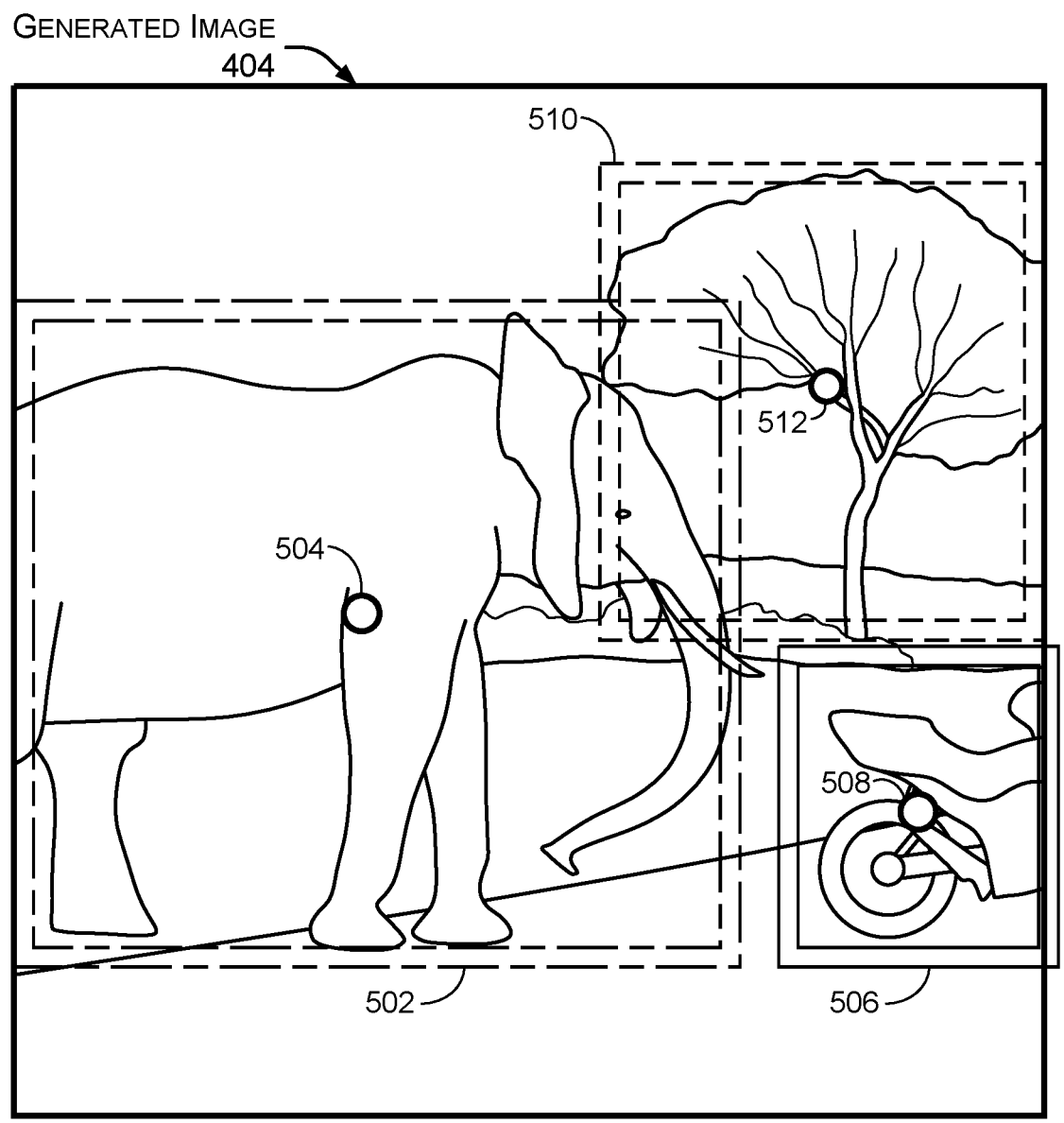
FIG. 5 illustrates an example of how an object detector can determine bounding boxes and centroids from objects in an image, consistent with some implementations of the present concepts.

For instance, FIG. 4 shows an example where a text string 402 is used to generate an image 404. FIG. 5 shows an example where image 404 is processed using an object detector to obtain bounding boxes and centroids for each detected object. Bounding box 502 around the elephant has a centroid 504, bounding box 506 around the motorcycle has a centroid 508, and bounding box 510 around the tree has a centroid 512.

Figure 6:
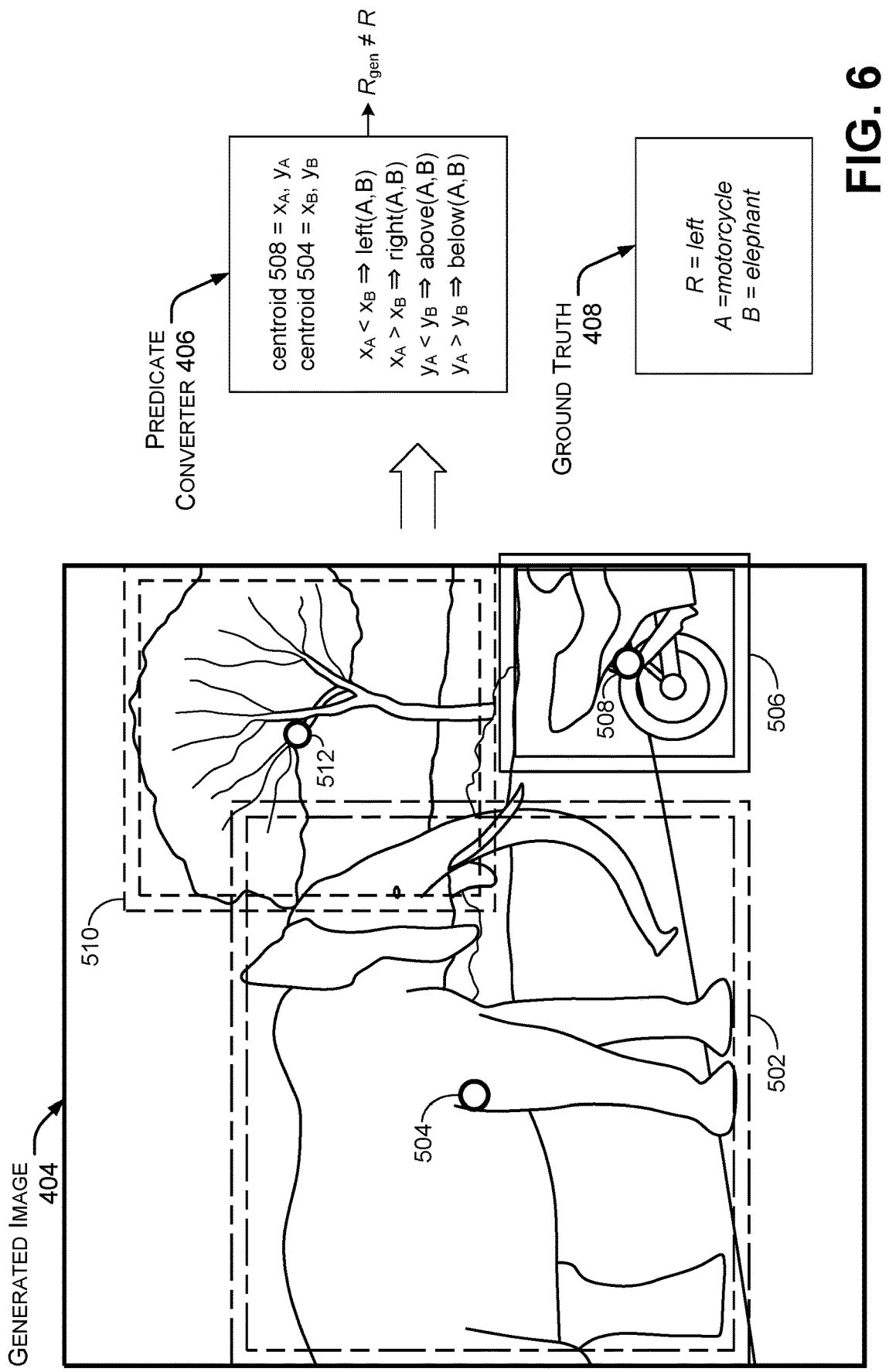
FIG. 6 illustrates an example of how centroids of bounding boxes can be converted to predicates expressing spatial relationships, consistent with some implementations of the present concepts.

FIG. 6 shows an example of how object centroids are located and converted into predicates indicating the spatial relationship between them. These predicates are compared with the ground truth relationship R to obtain the VISOR score. Centroid 508 of the motorcycle (object A) is shown as having location xa, ya and centroid 504 of the elephant (object B) is shown as having location xb, yb.

Based on the centroids, the spatial relationship $R_{gen}$ between them can be deduced using the rules shown in predicate converter 406 (e.g., a component of relationship evalution module 143). Finally, the generated relationship can be compared with ground-truth 408, which expresses a relationship R between the objects. VISOR scores can be computed as described above.

Experimental Results

The following experiments were performed using OWL-ViT, Minderer, et al., (2022). *Simple open-vocabulary object detection with vision transformers.* arXiv preprint arXiv: 2205.06230, an open-vocabulary object detector, with a CLIP backbone and ViT-B/32 transformer architecture and confidence threshold 0.1. The open-vocabulary functionality of OWL-ViT ensures that VISOR is widely applicable to other datasets, categories, and vocabularies. This removes dependence on specific datasets, making VISOR widely applicable for any freeform text input.

The following text-to-image synthesis models were studied as baselines for the following experiments: GLIDE, Nichol, et al., (2021). *Glide: Towards photorealistic image generation and editing with text-guided diffusion models.* arXiv preprint arXiv:2112.10741, DALLE-mini Dayma, et al., (2021). Dall•e mini, CogView2, Ding, et al., (2022). *Cogview2: Faster and better text-to-image generation via hierarchical transformers.* arXiv preprint arXiv:2204.14217, DALLE-v2, Ramesh, et al., (2022). *Hierarchical text-conditional image generation with clip latents.* arXiv preprint arXiv:2204.06125, and Stable-Diffusion (SD), Rombach, et al., (2022). *High-resolution image synthesis with latent diffusion models.* In Proceedings of the IEEE/CVF Conference on Computer Vision and Pattern Recognition (pp. 10684-10695), and two versions of Composable Diffusion Models (GLIDE+CDM and SD+CDM). N=4 images were generated for each text prompt from the SR2D dataset, to obtain 126,720 images per model and compare performance in terms of OA, VISOR, $VISOR_{cond}$, and $VISOR_{1/2/3/4}$.

Text-to-image synthesis models have been primarily compared in terms of characteristics such as photorealism (purely visual) and human judgment about image quality (subjective). The following experiments quantify whether existing automated multimodal metrics are useful for evaluating spatial relationships generated by text-to-image synthesis models. The metrics considered include: CLIPScore, Hessel, et al., (2021). *Clipscore: A reference-free evaluation metric for image captioning.* arXiv preprint arXiv:2104.08718 (cosine similarity between image and text embeddings) and image captioning-based evaluation (BLEU, Papineni, et al., (2002, July. *Bleu: a method for automatic evaluation of machine translation.* In Proceedings of the 40th annual meeting of the Association for Computational Linguistics (pp. 311-318), METEOR, Banerjee, et al., (2005, June). *METEOR: An automatic metric for MT evaluation with improved correlation with human judgments.* In Proceedings of the ACL workshop on intrinsic and extrinsic evaluation measures for machine translation and/or summarization (pp. 65-72), ROUGE, Rouge, L. C. (2004, July). *A package for automatic evaluation of summaries.* In Proceedings of Workshop on Text Summarization of ACL, Spain, CIDER, Vedantam, et al., (2015). *Cider: Consensus-based image description evaluation.* In Proceedings of the IEEE conference on computer vision and pattern recognition (pp. 4566-4575), SPICE, Anderson, et al., (2016). *Spice: Semantic propositional image caption evaluation.* In Computer Vision-ECCV 2016: 14th European Conference, Amsterdam, The Netherlands, Oct. 11-14, 2016, Proceedings, Part V, 14 (pp. 382-398). Springer International Publishing.

These metrics are used by generating a caption c for the synthesized image x=g(t) and computing the captioning score with respect to the reference input text t. Note that purely visual metrics such as FID and Inception Score ignore the text. Heusel, et al., (2017). *Gans trained by a two time-scale update rule converge to a local nash equilibrium.* Advances in neural information processing systems, 30, and Salimans, et al., (2016). *Improved techniques for training gans.* Advances in neural information processing systems, 29. Semantic object accuracy ignores all words except nouns, making them incapable of scoring spatial relationships. Hinz, et al., (2020). *Semantic object accuracy for generative text-to-image synthesis.* IEEE transactions on pattern analysis and machine intelligence, 44(3), 1552-1565.

Let $s^t$ be the score for (x, t) where x is the generated image and t is the input text. Let $t_{flip}$ be the transformed version of t obtained by inverting/flipping the spatial relationship in t (for example, left→right). Let $s_{flip}^t$ be the score for (x, $t_{flip}$). Then for each metric, define $\Delta_s$ as:

$$\Delta_s = \mathbb{E}_t[s^t - s_{flip}^t], \qquad (6)$$

i.e., the average difference between $s^t$ and $s_{flip}^t$ over the entire SR2D dataset.

Thus, $\Delta_s$ captures the ability of metric s to understand spatial relationships.

TABLE 2

| Model | BLEU-1 | BLEU-2 | BLEU-3 | BLEU-4 | METEOR |
| --- | --- | --- | --- | --- | --- |
| GLIDE | 0.29/0 | 0.14/1.89e−6 | 0.05/2.85e−6 | 0.02/7.44e−7 | 0.13/−9.85e−6 |
| GLIDE + CDM | 0.31/0 | 0.15/2.91e−5 | 0.06/7.64e−6 | 0.02/1.68e−6 | 0.15/6.42e−5 |
| DALLE-mini | 0.34/0 | 0.19/−4.37e−5 | 0.0935/−1.55e−5 | 0.04/−4.46e−6 | 0.19/2.09e−6 |
| Cogview-2 | 0.30/0 | 0.0719/1.33e−6 | 0.0719/1.33e−6 | 0.03/5.63e−6 | 0.16/−6.61e−6 |
| DALLE-2 | 0.36/0 | 0.1067/−4.7e−6 | 0.106/−4.76e−6 | 0.04/−1.45e−6 | 0.21/1.68e−4 |
| SD | 0.33/0 | 0.0804/9.68e−6 | 0.0804/9.68e−7 | 0.03/2.78e−7 | 0.19/1.03e−5 |
| SD + CDM | 0.32/0 | 0.17/1.12e−5 | 0.0723/5.07e−6 | 0.03/1.32e−6 | 0.17/1.62e−4 |

| Model | ROUGE | CIDER | SPICE | CLIPScore | VISOR |
| --- | --- | --- | --- | --- | --- |
| GLIDE | 0.35/−2.55e−6 | 0.18/1.13e−6 | 0.11/−8.14e−6 | 0.70/1.32e−3 | 0.02/0.01 |
| GLIDE + CDM | 0.36/1.69e−6 | 0.22/3.12e−5 | 0.14/−7.73e−5 | 0.75/−8.84e−6 | 0.06/0.05 |
| DALLE-mini | 0.41/−7.34e−6 | 0.34/−5.99e−5 | 0.20/3.33e−5 | 0.80/1.50e−3 | 0.16/0.12 |
| Cogview-2 | 0.36/−2.89e−6 | 0.25/8.67e−6 | 0.15/7.00e−5 | 0.72/1.48e−5 | 0.12/0.10 |
| DALLE-2 | 0.44/8.84e−6 | 0.40/−2.78e−5 | 0.22/−4.13e−5 | 0.84/1.79e−3 | 0.38/0.28 |
| SD | 0.40/−2.56e−6 | 0.31/4.27e−6 | 0.19/7.39e−5 | 0.79/1.49e−3 | 0.19/0.15 |
| SD + CDM | 0.38/4.43e−6 | 0.28/1.146e−5 | 0.18/−4.52e−5 | 0.77/3.57e−4 | 0.15/0.12 | shows s and $\Delta_s$ values for each previous metric and each model, while

TABLE 3

| Model | VISOR | VISOR$_{cond}$ | VISOR$_1$ | VISOR$_2$ | VISOR$_3$ | VISOR$_4$ |
| --- | --- | --- | --- | --- | --- | --- |
| GLIDE | 0.02/0.01 | 0.60/0.39 | 0.63/0.38 | 0.09/0.09 | 0.02/0.02 | 0.26/0.26 |
| GLIDE + CDM | 0.06/0.05 | 0.63/0.45 | 0.71/0.47 | 0.17/0.16 | 0.03/0.03 | 0.40/0.40 |
| DALLE-mini | 0.16/0.12 | 0.60/0.43 | 0.71/0.43 | 0.33/0.28 | 0.13/0.12 | 3.65/3.58 |
| Cogview-2 | 0.12/0.10 | 0.66/0.54 | 0.74/0.56 | 0.25/0.24 | 0.07/0.07 | 1.26/1.25 |
| DALLE-2 | 0.38/0.28 | 0.59/0.43 | 0.84/0.49 | 0.54/0.45 | 0.27/0.25 | 8.54/8.33 |
| SD | 0.19/0.15 | 0.63/0.48 | 0.76/0.51 | 0.33/0.29 | 0.11/0.11 | 2.65/2.61 |
| SD + CDM | 0.15/0.12 | 0.64/0.52 | 0.75/0.55 | 0.28/025 | 0.09/0.09 | 2.12/2.10 | shows the same scores for VISOR metrics. It can be seen that, for all previous metrics, $\Delta_s$ is negligible and close to zero, which implies that they return similar scores even if the text is flipped. For some cases, the difference is negative, implying that the score for the image and the flipped caption is higher. On the other hand, the $\Delta$ values for VISOR are high implying that VISOR assigns significantly lower scores for the flipped samples. These results establish the utility of the VISOR evaluation metrics, since none of the existing metrics are able to quantify spatial relationships reliably, and show the efficacy of VISOR for this purpose.

TABLE 4

| | | VISOR (%) | | | | | |
| --- | --- | --- | --- | --- | --- | --- | --- |
| Model | OA (%) | un-cond | cond | 1 | 2 | 3 | 4 |
| GLIDE | 3.36 | 1.98 | 59.06 | 62.86 | 9.54 | 1.59 | 0.26 |
| GLIDE + CDM | 10.17 | 6.43 | 63.21 | 70.52 | 16.48 | 2.92 | 0.40 |
| DALLE-mini | 27.10 | 16.17 | 59.67 | 71.22 | 32.54 | 12.82 | 3.65 |
| Cogview-2 | 18.47 | 12.17 | 65.89 | 74.37 | 25.40 | 7.15 | 1.26 |
| DALLE-2 | 63.93 | 39.89 | 59.27 | 83.92 | 53.86 | 26.52 | 8.54 |
| SD | 29.86 | 18.81 | 62.98 | 75.67 | 62.67 | 11.19 | 2.65 |
| SD + CDM | 23.27 | 14.99 | 64.41 | 74.89 | 27.65 | 9.19 | 2.12 | shows the results of benchmarking on the SR2D dataset. First note that the object accuracy of all models except DALLE-v2 is lower than 30%. While DALLE-v2 (63.93%) significantly outperforms other models, it still shows a large number of failures in generating both objects that are mentioned in the prompt. For the unconditional metrics VISOR and VISOR$_{1/2/3/4}$, DALLE-v2 is the best performing model. However, in terms of VISOR$_{cond}$, CogView2 has the highest performance. This implies that, although CogView2 is better than other models on those examples where both objects are generated, the large failures of CogView2 in OA result in a lower unconditional VISOR score. VISOR$_4$ is extremely low for all models including DALLE-v2 (8.54%), revealing a large gap in performance.

Human Study

A human evaluation study was conducted to understand the alignment of VISOR metrics with human judgment, and to quantify the gap between object detector performance and human assessments of object presence. For the human study, the following four models were employed: CogView2, DALLE-v2, Stable Diffusion (SD), and SD+CDM. Annotators were shown (via Amazon Mechanical Turk) an image generated by one of the four models, and were asked seven questions about it. The questions assessed human evaluation of image quality and scene realism (scene likelihood) on a Likert scale (1 through 5), the number of objects, answering True or False for presence of objects, selecting valid spatial relationships, and responding if two objects were merged in the image. A sample size of 1000 images per model and 3 workers per sample was employed.

Figure 7:
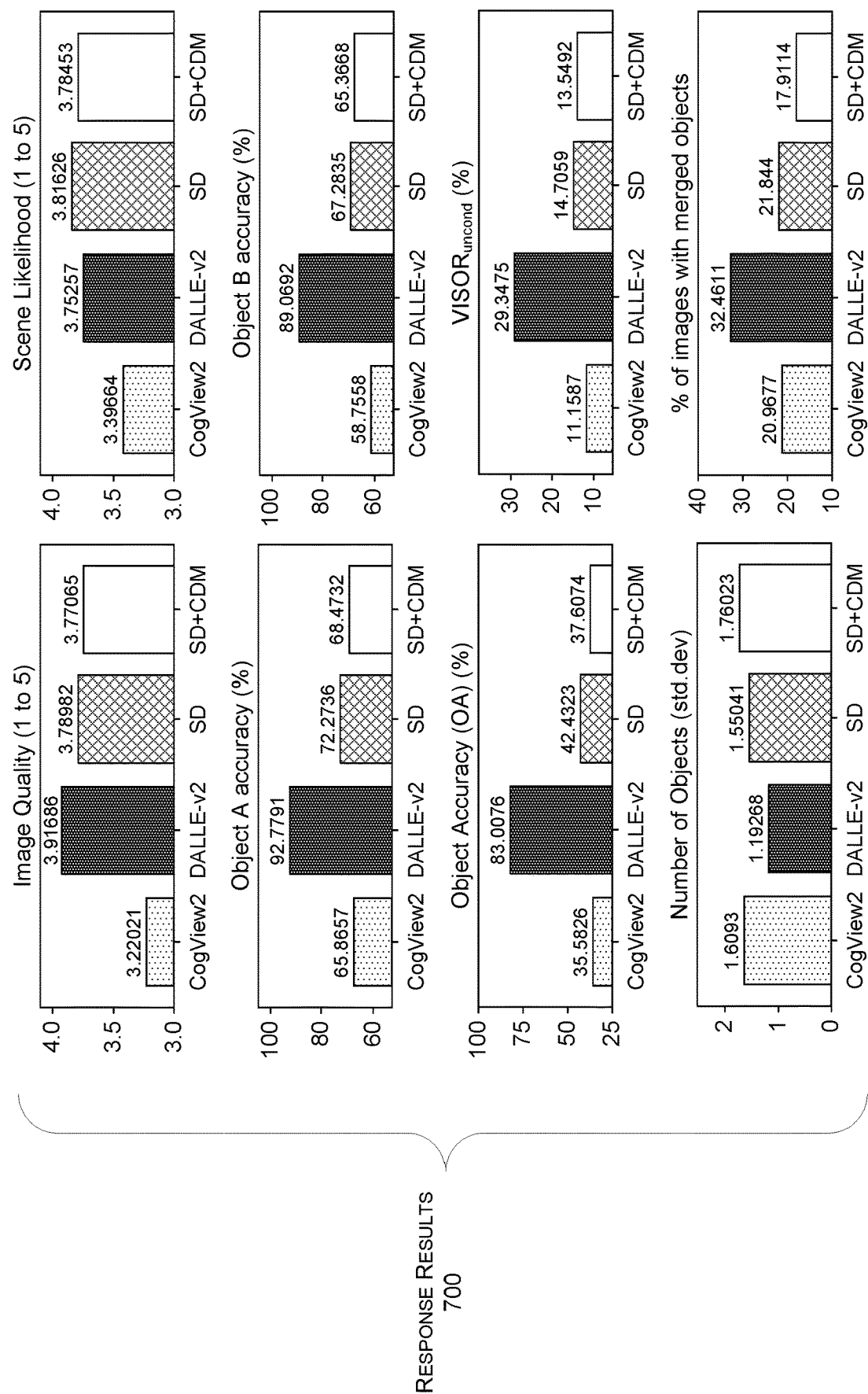
FIGS. 7-11 show examples of experimental results, consistent with some implementations of the present concepts.

FIG. 7 shows response results 700, which summarizes responses for each question in the human study. While DALLE-v2 received the highest image quality rating, SD and SD+CDM received higher scene likelihood rating. DALLE-v2 also had the largest number of images with merged objects (32.46%). Inter-annotator agreement was high for all questions in terms of majority (agreement between at least 2 out of 3 workers) and unanimous agreement (agreement between all 3 out of 3 workers) as noted below in

TABLE 5

| Response | CogView2 | DALLE-v2 | SD | SD + CDM |
| --- | --- | --- | --- | --- |
| Image Quality | 65.47/52.93 | 75.02/62.33 | 69.86/55.31 | 72.59/57.99 |
| Scene Likelihood | 64.40/50.78 | 72.13/59.62 | 69.47/52.35 | 67.19/53.99 |
| Num. Objects | 79.63/50.03 | 87.09/46.39 | 81.41/46.06 | 80.28/45.74 |
| Object A | 100.0/33.00 | 99.64/8.02 | 100.0/18.56 | 100.0/20.04 |
| Object B | 100.0/32.75 | 100.0/13.39 | 100.0/22.44 | 100.0/25.51 |
| Spatial Relation | 100.0/23.33 | 100.0/47.90 | 100.0/30.79 | 100.0/25.00 |
| Merged/Distinct | 100.0/43.02 | 99.64/58.85 | 100.0/39.95 | 100.0/38.60 |

Alignment of VISOR with Human Responses. Note that the ranking of models in terms of both object accuracy (OA) and VISOR is identical for the human study and for the automated VISOR scores in Table 4, i.e. DALLE-v2>SD>SD-CDM>CogView2.

TABLE 6

| Metric | CogView2 | DALLE-v2 | SD | SD – CDM |
|---|---|---|---|---|
| OA | 73.07 | 73.87 | 79.25 | 80.21 |
| VISOR | 88.48 | 77.41 | 88.43 | 88.80 |
| VISOR$_{cond}$ | 75.02 | 75.62 | 76.95 | 74.69 | shows the percentage of samples for which responses from humans matched the automated evaluation using object detectors.

The experiments also revealed a few common types of merging between objects that were observed. Common patterns observed include animals being rendered as patterns on inanimate objects and both objects retaining their typical shape but getting merged. A large proportion (more than 20%) of images have merged objects—this poses a significant challenge for generating distinct objects and their relationships using text-to-image synthesis models.

Performance per relationship is shown in

TABLE 7

| | VISOR$_{cond}$ (%) | | | |
|---|---|---|---|---|
| Model | left | right | above | below |
| GLIDE | 57.78 | 61.71 | 60.32 | 56.24 |
| GLIDE + CDM | 65.37 | 65.46 | 59.40 | 59.84 |
| DALLE-mini | 57.89 | 60.16 | 63.75 | 56.14 |
| CogView2 | 68.50 | 68.03 | 63.72 | 62.51 |
| DALLE-v2 | 56.47 | 56.51 | 60.99 | 63.24 |
| SD | 64.44 | 62.73 | 61.96 | 62.94 |
| SD + CDM | 69.05 | 66.52 | 62.51 | 59.94 |

| | Object Accuracy (%) | | | |
|---|---|---|---|---|
| Model | left | right | above | below |
| GLIDE | 3.10 | 3.46 | 3.49 | 3.36 |
| GLIDE + CDM | 12.78 | 12.46 | 7.75 | 7.68 |
| DALLE-mini | 22.29 | 21.74 | 33.62 | 30.74 |
| CogView2 | 20.34 | 19.30 | 17.71 | 16.54 |
| DALLE-v2 | 64.30 | 64.32 | 65.66 | 61.45 |
| SD | 29.00 | 29.89 | 32.77 | 27.80 |
| SD + CDM | 23.66 | 21.17 | 23.66 | 24.61 |

Note that five of the seven models have the best VISOR$_{cond}$ scores for horizontal relationships (left or right). However, five of the seven models have the best object accuracy for vertical relationships (above or below).

Performance per Supercategory. The 80 object categories in SR2D belong to 11 MS-COCO "supercategories". VISOR scores for each supercategory pair are reported for the best model (DALLE-v2). VISOR scores for commonly co-occurring supercategories such as "animal, outdoor" are highest whereas unlikely combinations of indoor-outdoor objects such as "vehicle, appliance" and "electronic, outdoor" have low performance.

Figure 8:
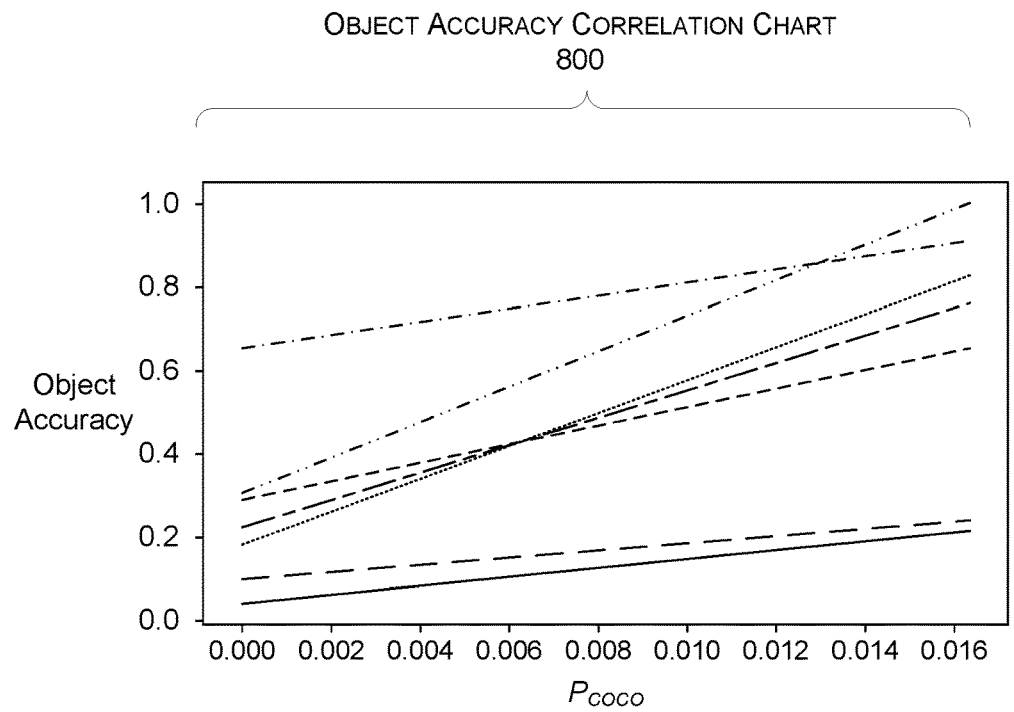
Figure 8:
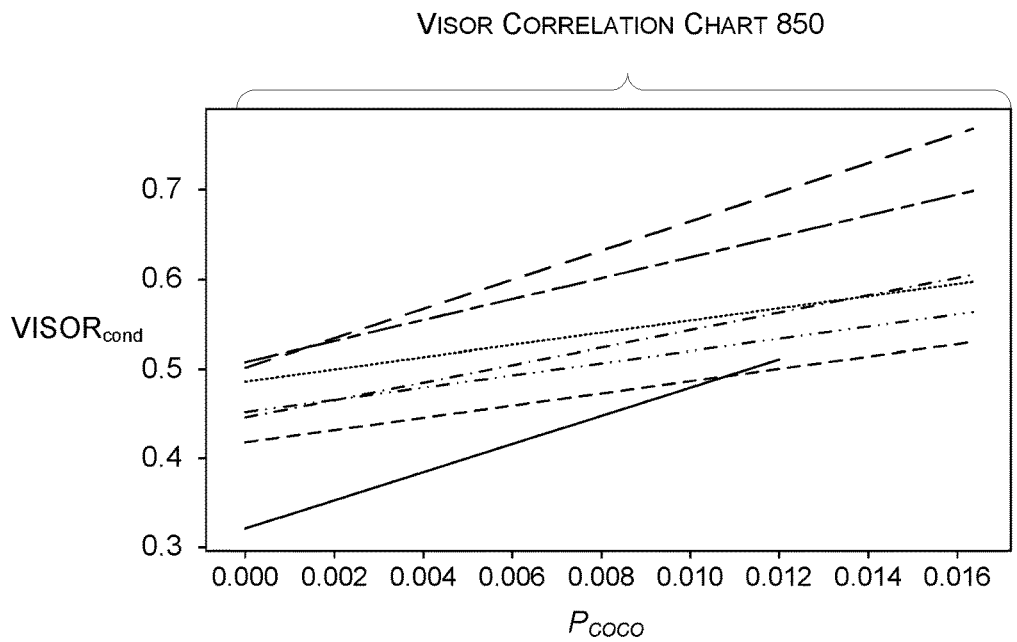
Figure 8:
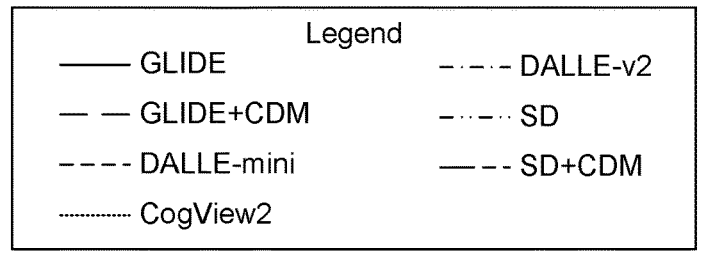

Correlation between VISOR and Object Co-occurrence. The object categories in the dataset span a wide range of commonly occurring objects from MS-COCO such as wild animals, vehicles, appliances, and humans, found in varying contexts, including combinations that do not appear together often in real life. For instance, an elephant is unlikely to be found indoors near a microwave oven. To understand how object co-occurrence affects VISOR, first determine P$_{COCO}$ (A, B), the probability of co-occurrence for each object pair (A, B) as a proxy for real-world object co-occurrence. Then, the correlation of object accuracy for pair (A, B) with its P$_{COCO}$(A, B) was plotted as object accuracy correlation chart 800, shown in FIG. 8. The correlation of VISOR$_{cond}$ and P$_{COCO}$(A, B) was plotted as VISOR correlation chart 850. Correlation are positive for all models for both OA and VISOR$_{cond}$, implying that the quality of outputs is likely to be better for commonly co-occurring objects, clearly establishing a bias towards real-world likelihood. This correlation shows the difficulty in generating unlikely relationships such as "an elephant to the left of a microwave" even though such unlikely combinations may be desired by creators, pursuing artistic compositions.

Figure 9:
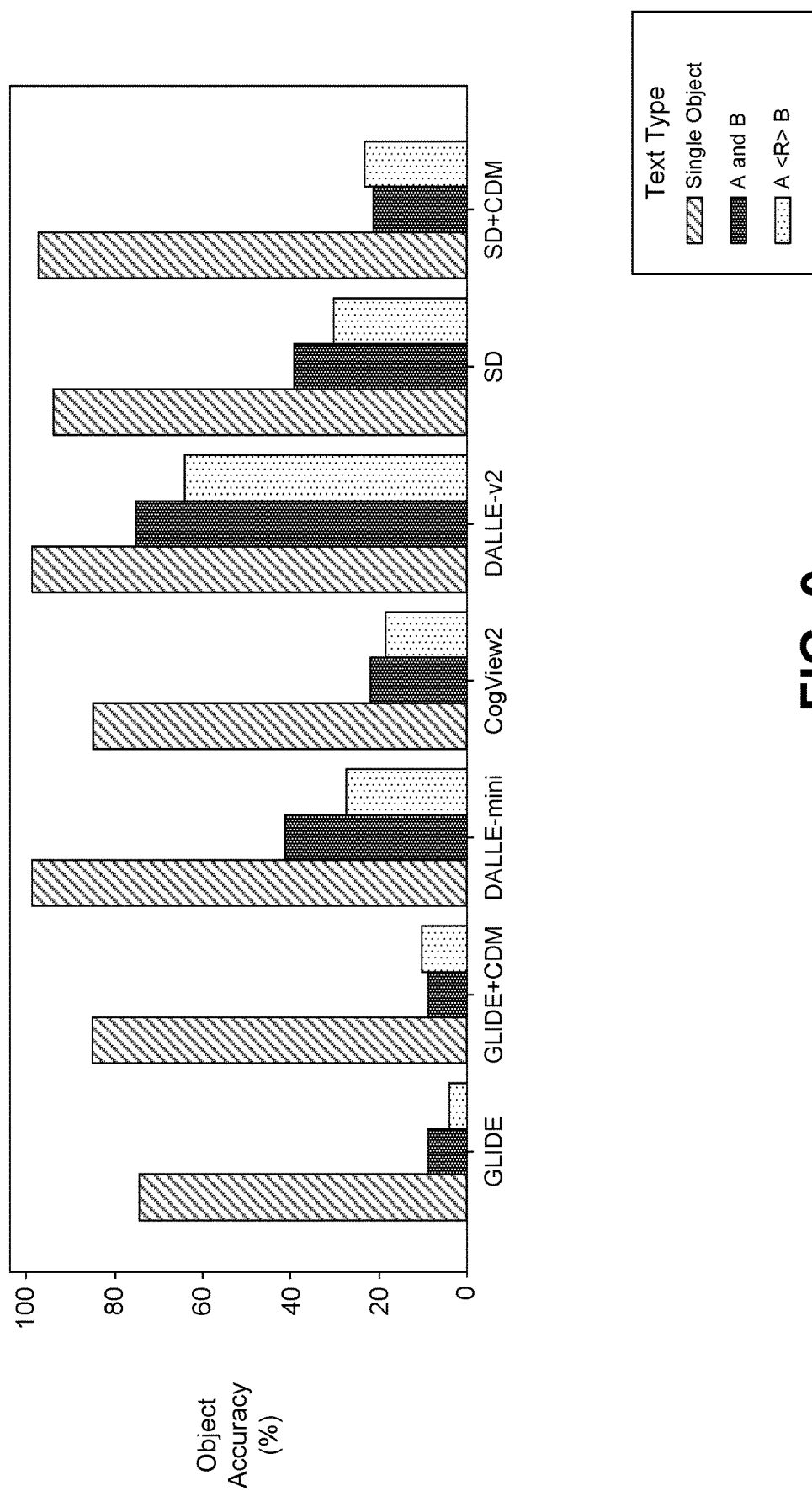

Object Generation Bias. Object accuracy was compared for three types of inputs to generate images: (1) single objects text such as "an elephant", (2) multiple object conjunction such as "an elephant and a cat", and (3) relational texts such as "an elephant to the right of a cat". Single vs. multiple object correlation chart 900, shown in FIG. 9, indicates that OA is significantly higher for single objects than for multiple objects for all models. Thus, composition using conjunction is challenging.

Figure 10:
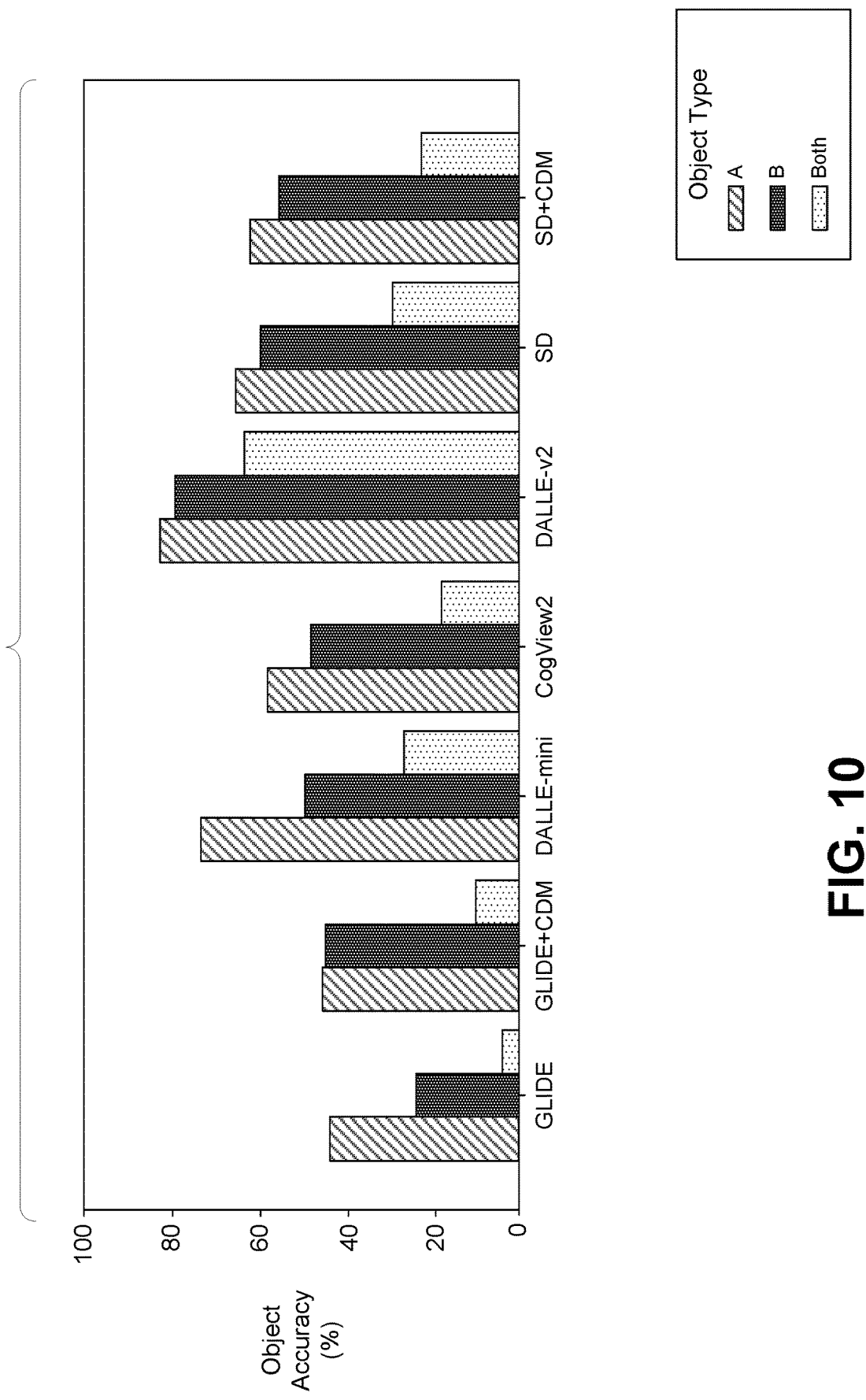

Text-Order Bias. FIG. 10 includes a first vs. second object correlation chart 1000, which shows that for all models, OA for the first mentioned object (A) in the text is significantly higher than OA for the second object (B); generating both objects together is most challenging.

Consistency between equivalent phrases. Ideally, given two equivalent inputs such as "a cat above a dog" and "a dog below a cat", the model should generate images with the same spatial relationship. To evaluate this consistency, cases in which OA=1 (both objects are detected) were considered and the consistency for each relationship type is shown in

TABLE 8

| | Relationship Type | | | | |
|---|---|---|---|---|---|
| Model | left | right | above | below | Average |
| GLIDE | 45.90 | 58.93 | 63.16 | 52.63 | 55.16 |
| GLIDE + CDM | 61.99 | 59.15 | 54.79 | 56.15 | 58.02 |
| DALLE-mini | 54.75 | 52.28 | 54.64 | 55.77 | 54.36 |
| CogView2 | 67.32 | 65.38 | 65.67 | 66.95 | 66.33 |
| DALLE-v2 | 48.81 | 48.10 | 48.72 | 48.15 | 48.45 |
| SD | 58.71 | 61.36 | 55.36 | 55.39 | 57.71 |
| SD + CDM | 64.69 | 65.71 | 61.35 | 57.71 | 62.37 |

Note that the best performing model DALLE-v2 is the least consistent among all models, while CogView2 is the most consistent model. This result shows that merely rephrasing the input can have a large influence on the spatial correctness of the output.

Figure 11:
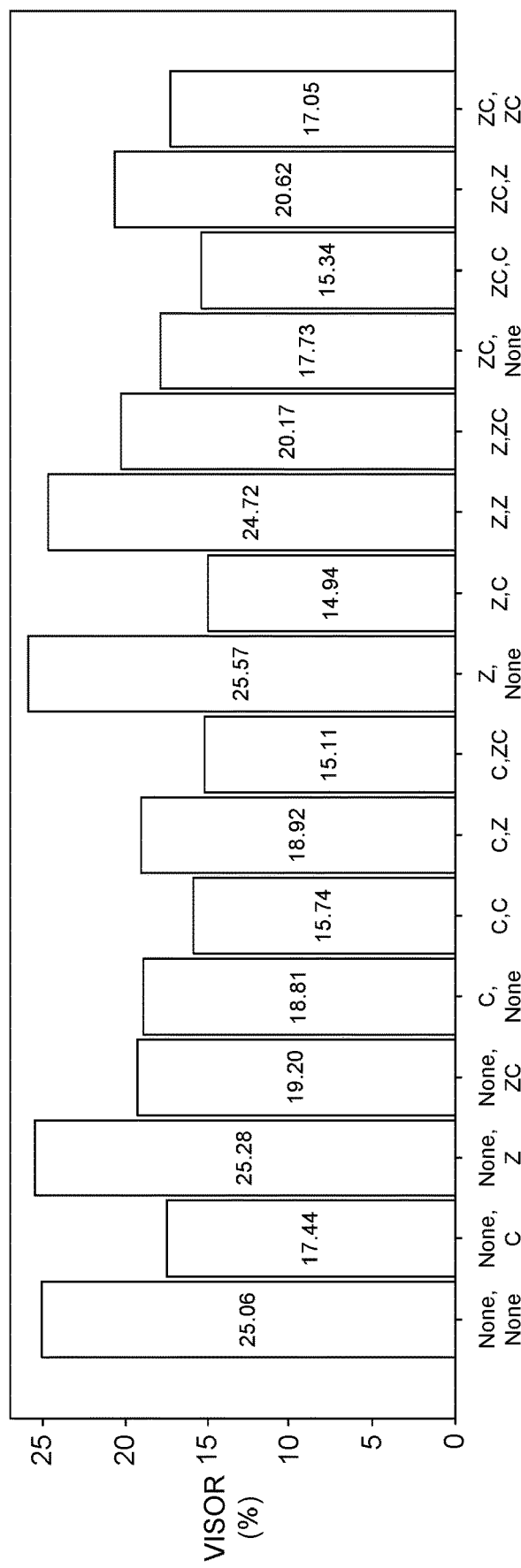

Effect of Attributes on Spatial Understanding. A case study was performed with Stable Diffusion (SD) to seek an understanding of the impact of sentence complexity on a model's VISOR performance. The complexity of text prompts was increased by randomly assigning two attributes (size Z and color C) to the object category, via templates of the form [ZA] [CA]<A> <R> [ZB] [CB]<B>. 11 object categories representative of each supercategory in COCO, 8 colors, and 4 sizes were employed. As shown in FIG. 11 via attribute effect chart 1100, there is a drop in performance in 13 out of 15 types of attribute combinations relative to image generation without attributes. Addition of the color attribute (C) leads to a large drop in performance. Adding size descriptors (Z) may improve performance. This analysis suggests that attributes may negatively influence spatial compositionality.

Applications

There are various applications of the different VISOR metrics described above. One useful application involves evaluating text-to-image synthesis models as described above. Given a single text-to-image synthesis model, VISOR metrics can generally convey how well that text-to-image synthesis model performs with respect to generating images that accurately reflect spatial relationships between objects as expressed in text used to generate the images.

Consider a scenario where a given text-to-image synthesis model is producing images with relatively low VISOR scores. A developer that wishes to improve that text-to-image synthesis model can gain additional insight into model performance using $VISOR_{cond}$. If the text-to-image synthesis model produces relatively low $VISOR_{cond}$ scores while producing high object accuracy scores, this suggests that development efforts should focus on revising the text-to-image synthesis model to replicate spatial relationships. On the other hand, if the text-to-image synthesis model produces relatively high $VISOR_{cond}$ scores and relatively low accuracy scores, this suggests that the text-to-image synthesis model is able to accurately replicate spatial relationships but is having difficulty generating the correct object types, and accordingly development efforts should focus on improving the ability of the text-to-image synthesis model to produce the correct object types.

As a further example, consider an overall image quality score that is based on one or more VISOR metrics as well as one or more other metrics, such as CLIPScore. Each individual metric can provide different information about characteristics of an image. Thus, a user concerned with high semantic similarity between text and generated images might weight a CLIPscore relatively highly and a VISOR score lower in computing an overall image quality score for a given image. Conversely, a user concerned more with spatial relationships than semantic similarity might weight a VISOR score relatively higher than CLIPscore. This same approach can be employed for other image quality metrics such as those described above.

Individual VISOR scores or overall quality scores with a VISOR component can also be employed to rank text-to-image synthesis models relative to one another. For instance, consider a scenario where multiple text-to-image synthesis models are being considered for deployment for a specific web application. Consider an interior design application where the relative positioning of objects is of critical importance to producing useful images, e.g., "a couch next to a window" is an important spatial relationship to produce. Consider instead an artistic application where sometimes unexpected spatial relationships could be considered surprisingly useful, e.g., an artist might find that a couch presented in an unusual place in a room has an unanticipated aesthetic quality. Thus, text-to-image synthesis models that accurately replicate spatial relationships could be ranked higher for the interior design application by using only VISOR metrics or weighting them relatively highly in a combined metric, whereas text-to-image synthesis models that produce unexpected spatial relationships, perhaps with more realistic or otherwise appealing image quality, might be ranked higher for the artistic application by lower relative weighting of VISOR metrics.

As another example, consider an image search scenario where a user wishes to search for images in a web-based search engine or a local or cloud-based image repository (e.g., their own social media images). Referring back to FIG. 3, assume a user inputs the text string "An orange above a giraffe" as a query, and all four images shown in FIG. 3 for this text string are present in the repository. Since the second and third images do not match the spatial relationship expresed in the query, these images can be filtered out so that the user only receives search results that match their query, e.g., the first and fourth images.

As another example, consider a scenario where a user inputs captions for the images in their respository. If the user inputs the caption "An orange above a giraffe" for the second or third image shown in FIG. 3, then the user can be provided an indication that this caption is incorrect. One way to do so is to auto-suggest an alternative caption, e.g., "an orange below a giraffe" for the second image shown in FIG. 3. One way to generate suggested captions involves inputting the image to an image-to-text model. Alternatively, a reverse template-based approach can be employed to generate an alternative caption, where the templates described above are used to generate suggested captions, e.g., by populating the templates with object categories provided by an object detector and spatial relationships determined using bounding box centroids as described above.

In still further implementations, captions generated by image-to-text models can be evaluated by comparison to text used to generate images. If the object categories and spatial relationships generated by an image-to-text model for a given image match those expressed in text used to generate the image, this can be considered a positive evaluation of the caption. If not, this can be considered a negative evaluation of the caption. These evaluations can be employed to rank or refine the image-to-text model, e.g., by using the evaluations as training labels.

In still further implementations, VISOR metrics can be employed to cleanse a corpus of images and matching text. For instance, referring back to FIG. 3, assume a corpus initially includes all of the images shown therein. If this corpus were used directly to train a text-to-image synthesis model, e.g., using the text strings as inputs and the images as training targets, some of the training targets would be images with incorrect spatial relationships. By removing images with incorrect spatial relationships prior to training, a clean corpus can be produced that will encourage the text-to-image synthesis model to learn to generate images with correct spatial relationships.

A similar approach can be employed to produce a clean corpus for training an image-to-text model where the model receives the images in the corpus as inputs and the training targets are the corresponding text strings used to generate the images. By removing images with incorrect spatial relationships prior to training, a clean corpus can be produced that will encourage the image-to-text model to learn to generate text that correctly characterizes spatial relationships in images input to the model.

Technical Effect

As noted previously, traditional metrics for characterizing image quality do not accurately reflect whether the images correctly reflect spatial relationships in text associated with the images. For applications where it is important to accurately characterize spatial relationships, these metrics tend to fall short. By using the disclosed VISOR metrics, either individually or in combination with one or more traditional metrics, various deficiencies of prior metrics can be remedied.

As noted previously, using the disclosed VISOR metrics can enable manual or automated selection of text-to-image synthesis models for specific applications. By selecting a particular text-to-image synthesis model that accurately produces images that match corresponding spatial relationships expressed in text, the generation of many irrelevant images can be avoided. This can preserve computing resources such as processor time used to generate the images, storage or memory used to store the images, and/or bandwidth used to communicate the images.

For instance, as also noted above, image search functionality can be improved by filtering out images that do not accurately reflect spatial relationships provided by a query. As a consequence, users can receive more relevant images in response to a text query, either when searching their own personal image repository or doing an image search on a web search engine. This can also save computing resources such as storage, memory, or bandwidth that would be used to store or communicate any irrelevant images that would not have otherwise been filtered out.

In addition, as noted above, the disclosed VISOR metrics can be employed to detect errors in user-generated or automatically-generated captions for a given image. By noting incorrect captions as well as suggesting alternative captions to replace the incorrect captions, users can be presented with more accurate captions from search results and also avoid any inadvertent mistakes in captioning their own images.

In addition, as noted above, the disclosed VISOR metrics can be employed to cleanse a corpus of training data used to train a text-to-image synthesis model or an image-to-text model. First, this reduces the amount of noise in the corpus, likely resulting in a more accurate model. Second, the removal of noisy examples prior to training saves computing resources such as storage, memory, or bandwidth that would be used during training on the irrelevant images.

Device Implementations

As noted above with respect to FIG. 1, system 100 includes several devices, including a client device 110, a server 120, a server 130, and a server 140. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 150. Without limitation, network(s) 150 can include one or more local area networks (LANs), wide area networks (WANs), the Internet, and the like.

Various examples are described above. Additional examples are described below. One example includes method comprising obtaining an image and text associated with the image detecting two or more objects in the image determining respective locations of the two or more detected objects in the image based at least on the respective locations of the two or more detected objects, determining whether a spatial relationship between the two or more detected objects matches a corresponding spatial relationship expressed by the text outputting a value reflecting whether the spatial relationship between the two or more detected objects matches the corresponding spatial relationship expressed by the text.

Another example can include any of the above and/or below examples where the value reflects whether the two or more detected objects match respective object categories expressed by the text.

Another example can include any of the above and/or below examples where the method further comprises generating the image from the text by inputting the text to a text-to-image synthesis model.

Another example can include any of the above and/or below examples where the method further comprises generating another value reflecting whether at least a threshold number of spatial relationships between multiple detected objects in multiple images generated by inputting the text to the text-to-image synthesis model match the corresponding spatial relationship expressed by the text.

Another example can include any of the above and/or below examples where the method further comprises generating another value reflecting a conditional probability that spatial relationships between multiple detected objects in multiple images generated by inputting multiple instances of text to the text-to-image synthesis model match corresponding spatial relationships expressed by the multiple instances of text, given that the multiple detected objects match respective object categories expressed by the multiple instances of text.

Another example can include any of the above and/or below examples where the method further comprises ranking the text-to-image synthesis model relative to another text-to-image synthesis model based at least on the value and another value reflecting whether another spatial relationship between two or more detected objects in another image generated by the another text-to-image synthesis model using the text matches the corresponding spatial relationship expressed by the text.

Another example can include any of the above and/or below examples where the the detecting comprises inputting the image to an object detector that outputs respective categories of the two or more detected objects.

Another example can include any of the above and/or below examples where the method further comprises obtaining, from an object detector, bounding boxes around the two or more detected objects determining the spatial relationship between the two or more detected objects based on a spatial relationship between centroids of the bounding boxes.

Another example includes a system comprising a processor a storage medium storing instructions which, when executed by the processor, cause the processor to determine respective locations of two or more objects in an image based at least on the respective locations of the two or more objects, determine whether a spatial relationship between the two or more objects matches a corresponding spatial relationship expressed by text associated with the image output a value reflecting whether the spatial relationship between the two or more objects matches the corresponding relationship expressed by the text associated with the image.

Another example can include any of the above and/or below examples where the instructions, when executed by the processor, cause the processor to filter searchable images to obtain image search results based at least on whether spatial relationships between objects in the searchable images match spatial relationships expressed in search queries.

Another example can include any of the above and/or below examples where the searchable images are provided by a web-based search engine or in a local or cloud-based image repository associated with a particular user.

Another example can include any of the above and/or below examples where the text is a caption for the image.

Another example can include any of the above and/or below examples where the caption is user-generated and the instructions, when executed by the processor, cause the processor to: output an indication whether the caption matches the spatial relationship between the two or more objects.

Another example can include any of the above and/or below examples where the instructions, when executed by the processor, cause the processor to: generate a suggested alternative caption that expresses the spatial relationship between the two or more objects output the suggested alternative caption.

Another example can include any of the above and/or below examples where the caption is generated by an image-to-text model.

Another example can include any of the above and/or below examples where the instructions, when executed by the processor, cause the processor to: perform a comparison of the caption generated by the image-to-text model to another text used to generate the image using a text-to-image synthesis model refine or evaluate the image-to-text model based at least on the comparison.

Another example can include any of the above and/or below examples where the instructions, when executed by the processor, cause the processor to: generate an overall image quality score from the value and at least one other value reflecting at least one other characteristic of the image.

Another example can include any of the above and/or below examples where the instructions, when executed by the processor, cause the processor to: cleanse a corpus of images and associated text based at least on values reflecting whether spatial relationships between objects in images in the corpus match spatial relationships expressed by the associated text.

Another example can include any of the above and/or below examples where the instructions, when executed by the processor, cause the processor to: train a machine learning model based at least on the cleansed corpus.

Another example includes a computer-readable storage medium storing instructions which, when executed by a computing device, cause the computing device to perform acts comprising obtaining an image and text relating to the image detecting two or more objects in the image determining respective locations of the two or more detected objects in the image based at least on the respective locations of the two or more detected objects, determining whether a spatial relationship between the two or more detected objects matches a corresponding spatial relationship expressed by the text outputting a value reflecting whether the spatial relationship between the two or more detected objects matches a corresponding spatial relationship expressed by the text.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method comprising:
accessing a corpus of images and associated text expressing first spatial relationships between objects in the images;
using a machine-trained objection detection module:
   detecting the objects in respective images of the corpus; and
   determining respective locations of the detected objects in the respective images;
based at least on the respective locations of the detected objects, determining second spatial relationships between the detected objects in the respective images; and
cleansing the corpus by:
   removing individual images from the corpus having first spatial relationships expressed by the text that do not match corresponding second spatial relationships determined from the respective locations of the detected objects; and
   retaining, in the corpus, other images having first spatial relationships expressed by the text that match corresponding second spatial relationships determined from the respective locations of the detected objects.

2. The method of claim 1, wherein the detecting comprises inputting the image to an object detector that outputs respective categories of the detected objects.

3. The method of claim 1, further comprising:
obtaining, from an object detector, bounding boxes around the detected objects; and
determining the second spatial relationships between the detected objects based on corresponding spatial relationships between centroids of the bounding boxes.

4. The method of claim 1, wherein the machine-trained object detection module comprises a vision transformer.

5. The method of claim 1, further comprising:
training a text-to-image synthesis model using the cleansed corpus.

6. The method of claim 5, wherein the training involves providing text strings as inputs to the text-to-image synthesis model and using the other images retained in the cleansed corpus as training targets for output of the text-to-image synthesis model.

7. The method of claim 1, further comprising:
training an image-to-text model using the cleansed corpus.

8. The method of claim 7, wherein the training involves providing the other images retained in the cleansed corpus to the image-to-text model and using corresponding text strings for the other images as training targets for output of the image-to-text model.

9. A system comprising:
a processor; and
a storage medium storing instructions which, when executed by the processor, cause the processor to:
access a corpus of images and associated text expressing first spatial relationships between objects in the images;
using a machine-trained objection detector:
   detect the objects in respective images of the corpus; and
   determine respective locations of the detected objects in the respective images;
based at least on the respective locations of the detected objects, determine second spatial relationships between the detected objects in the respective images; and
cleanse the corpus by:
   removing individual images from the corpus having first spatial relationships expressed by the text that do not match corresponding second spatial relationships determined from the respective locations of the detected objects; and
   retaining, in the corpus, other images having first spatial relationships expressed by the text that match corresponding second spatial relationships determined from the respective locations of the detected objects.

10. The system of claim 9, wherein the instructions, when executed by the processor, cause the processor to:
obtain, from the machine-trained object detector, bounding boxes around the detected objects; and
determine the second spatial relationships between the detected objects based on corresponding spatial relationships between centroids of the bounding boxes.

11. The system of claim 10, wherein the machine-trained object detector comprises a vision transformer.

12. The system of claim 11, wherein the instructions, when executed by the processor, cause the processor to:
train a text-to-image synthesis model using the cleansed corpus.

13. The system of claim 12, wherein the training involves providing text strings as inputs to the text-to-image synthesis model and using the other images retained in the cleansed corpus as training targets for output of the text-to-image synthesis model.

14. The system of claim 11, wherein the instructions, when executed by the processor, cause the processor to:
train an image-to-text model using the cleansed corpus.

15. The system of claim 14, wherein the training involves providing the other images retained in the cleansed corpus to the image-to-text model and using corresponding text strings for the other images as training targets for output of the image-to-text model.

16. A hardware computer-readable storage medium storing instructions which, when executed by a computing device, cause the computing device to perform acts comprising:
accessing a corpus of images and associated text expressing first spatial relationships between objects in the images;
using a machine-trained objection detection module:
   detecting the objects in respective images of the corpus; and
   determining respective locations of the detected objects in the respective images;
based at least on the respective locations of the detected objects, determining second spatial relationships between the detected objects in the respective images; and
cleansing the corpus by:
   removing individual images from the corpus having first spatial relationships expressed by the text that do not match corresponding second spatial relationships determined from the respective locations of the detected objects; and
   retaining, in the corpus, other images having first spatial relationships expressed by the text that match corresponding second spatial relationships determined from the respective locations of the detected objects.

17. The hardware computer-readable storage medium of claim 16, the acts further comprising:
training a text-to-image synthesis model using the cleansed corpus.

18. The hardware computer-readable storage medium of claim 17, wherein the training involves providing text strings as inputs to the text-to-image synthesis model and using the other images retained in the cleansed corpus as training targets for output of the text-to-image synthesis model.

19. The hardware computer-readable storage medium of claim 16, the acts further comprising:
   training an image-to-text model using the cleansed corpus.

20. The hardware computer-readable storage medium of claim 19, wherein the training involves providing the other images retained in the cleansed corpus to the image-to-text model and using corresponding text strings for the other images as training targets for output of the image-to-text model.

\* \* \* \* \*